United States Patent
Gürke et al.

(10) Patent No.: US 11,632,904 B2
(45) Date of Patent: Apr. 25, 2023

(54) METHOD FOR ANALYZING THE OPERATING CONDITION OF A CUTTING DEVICE AND CUTTING DEVICE

(71) Applicant: SMF—HOLDING GMBH, Eichelhardt (DE)

(72) Inventors: Steffen Gürke, Windeck-Halscheid (DE); Ralf Schmidt, Mörsbach (DE); Sascha Otto, Racksen (DE)

(73) Assignee: SMF—HOLDING GMBH, Eichelhardt (DE)

( * ) Notice: Subject to any disclaimer, the term of this patent is extended or adjusted under 35 U.S.C. 154(b) by 601 days.

(21) Appl. No.: 16/627,943

(22) PCT Filed: Jul. 4, 2018

(86) PCT No.: PCT/EP2018/068157
§ 371 (c)(1),
(2) Date: Dec. 31, 2019

(87) PCT Pub. No.: WO2019/008071
PCT Pub. Date: Jan. 10, 2019

(65) Prior Publication Data
US 2021/0144917 A1    May 20, 2021

(30) Foreign Application Priority Data
Jul. 5, 2017 (EP) ..................................... 17179740

(51) Int. Cl.
*A01D 41/127* (2006.01)
*A01D 34/14* (2006.01)
(Continued)

(52) U.S. Cl.
CPC .......... *A01D 41/127* (2013.01); *A01D 34/14* (2013.01); *G01B 21/00* (2013.01); *G01L 5/00* (2013.01)

(58) Field of Classification Search
CPC ...... A01D 41/127; A01D 34/14; G01B 21/00; G01L 5/00
(Continued)

(56) References Cited

U.S. PATENT DOCUMENTS

| 7,658,059 B2 * | 2/2010 | Majkrzak ............... A01D 34/38 56/264 |
| 2016/0084987 A1 | 3/2016 | Dybro et al. |

(Continued)

FOREIGN PATENT DOCUMENTS

| CN | 106292272 A | 1/2017 |
| EP | 3 095 314 A1 | 11/2016 |
| EP | 3 167 701 A1 | 5/2017 |

OTHER PUBLICATIONS

International Search Report for PCT/EP2018/068157 dated Oct. 17, 2018 [PCT/ISA/210].

*Primary Examiner* — Michael P Nghiem
(74) *Attorney, Agent, or Firm* — Sughrue Mion, PLLC

(57) ABSTRACT

A method for analyzing the operating state of a cutting device for mowing crop, the cutting device having at least one mowing knife having cutting edges which interact with counter cutting edges of the cutting device, including: detecting of a signal representing the stroke position of the mowing knife; detecting a signal representing the knife force for driving the mowing knife as a function of the stroke position, and determining crop and/or cutting system properties on the basis of an evaluation of the signal representing the knife force as a function of the stroke position.

11 Claims, 5 Drawing Sheets

(51) Int. Cl.
*G01B 21/00* (2006.01)
*G01L 5/00* (2006.01)

(58) Field of Classification Search
USPC ...................................................... 56/10.2 B
See application file for complete search history.

(56) References Cited

U.S. PATENT DOCUMENTS

| | | | |
|---|---|---|---|
| 2017/0046639 A1* | 2/2017 | Osborne | H04W 4/40 |
| 2017/0127609 A1* | 5/2017 | Dunn | A01D 34/14 |
| 2017/0127611 A1* | 5/2017 | Dunn | A01D 34/38 |
| 2021/0137002 A1* | 5/2021 | Dunn | A01D 34/38 |

* cited by examiner

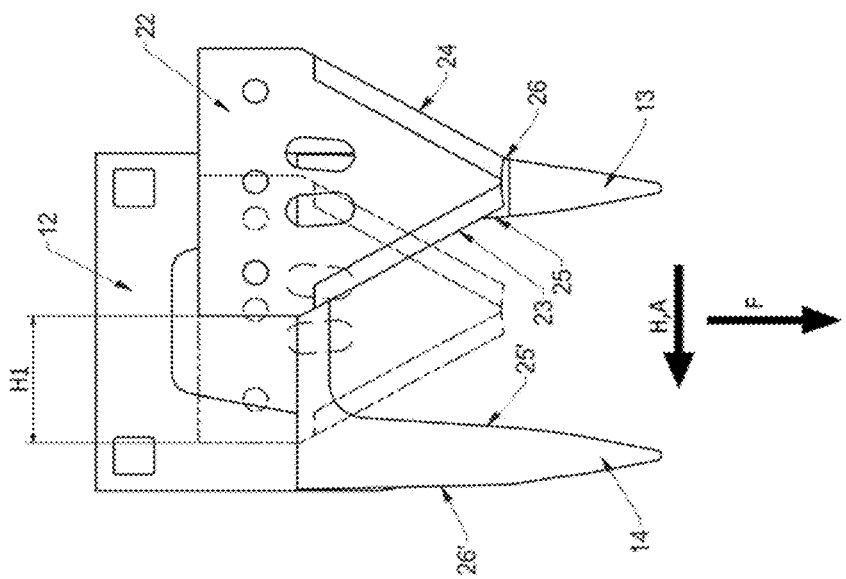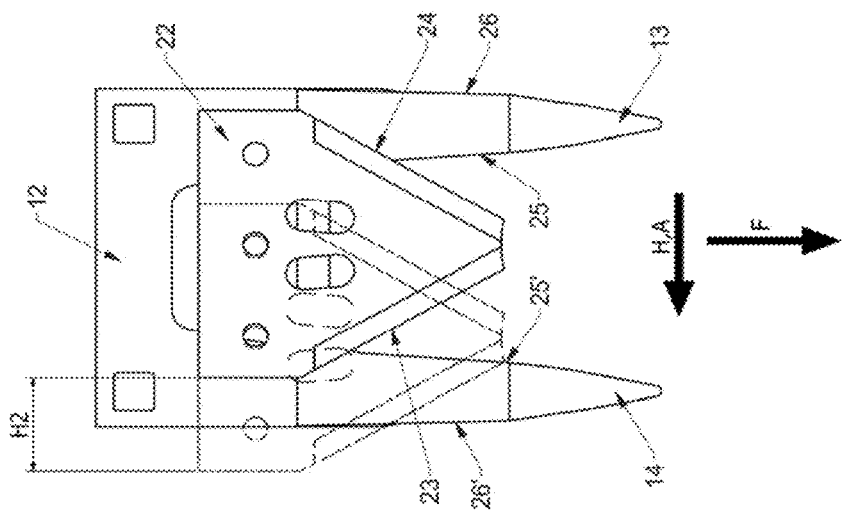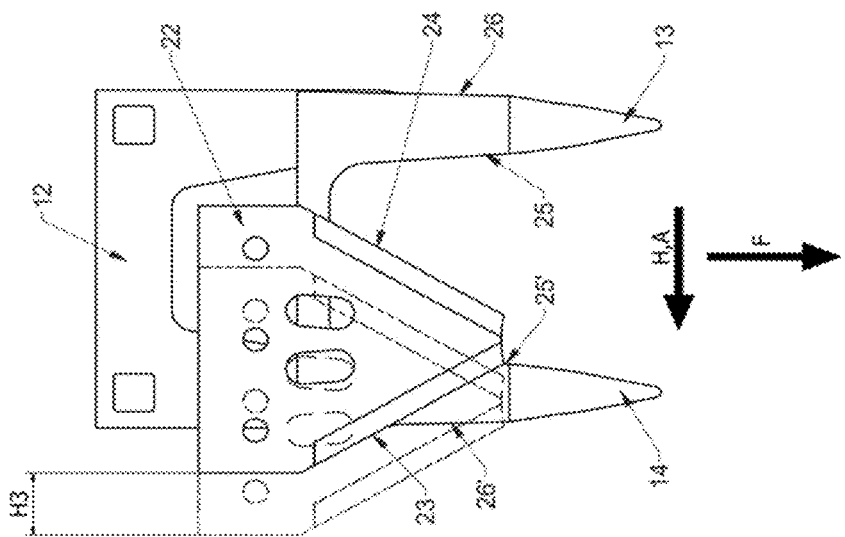

METHOD FOR ANALYZING THE OPERATING CONDITION OF A CUTTING DEVICE AND CUTTING DEVICE

CROSS REFERENCE TO RELATED APPLICATIONS

This application is a National Stage of International Application No. PCT/EP2018/068157 filed Jul. 4, 2018, claiming priority based on European Patent Application No. 17179740.0 filed Jul. 5, 2017.

BACKGROUND OF THE INVENTION

Field of the Invention

The invention concerns a method and a cutting device for analyzing the operating condition of a cutting device of a harvesting machine, such as a combine harvester.

Background

In today's harvesting machines, the analysis of the operating states of individual components of harvesting machines is becoming increasingly important. In order to increase harvesting performance, for example, the aim is to maximize the travel speed of the harvester without risking blockages in the crop flow. For this purpose, for example, the determination of the current crop flow is decisive in order to regulate it as far as possible to a maximum value depending on the stock density of the crop. The sensors required to determine the crop flow are usually located in subsequent arranged components of the harvester for processing the cut crop or in conveyor systems of the harvester.

US 2016/0084987 A1 proposes to install sensors in the attachment of a combine harvester to determine the yield quantity and its variability in order to obtain measured values about the operating status, such as the crop flow rate, as early as possible during the harvesting process. The sensors can, for example, be torque sensors of rotating cutting tools. Using the data obtained with these sensors, a geographical map can be produced that records the crop density in the field for each geoposition of the crop. This data can then be used to adjust the application of seeds and fertilizer, as well as to adjust or control power when harvesting again.

The object of this invention is to provide a method and a cutting device for analyzing the operating condition of the cutting device of a harvesting machine which is particularly suitable for reciprocating mowing knives.

SUMMARY OF THE INVENTION

The object is met by a method for analyzing the operating state of a cutting device for mowing crop, the cutting device having at least one mowing knife which is driven in reciprocating manner in a stroke direction, and the mowing knife having cutting edges which interact with counter cutting edges of the cutting device, with the following method steps:

Detecting of a signal representing the stroke position of the mowing knife,

Detecting a signal representing the knife force for driving the mowing knife as a function of the stroke position, and Determination of crop and/or cutting system properties on the basis of an evaluation of the signal representing the knife force as a function of the stroke position.

In this context, the operating condition of the cutting device in the narrower sense is to be equated with the crop and/or cutting system characteristics and may also include further characteristics of the cutting device beyond these. The cutting system comprises the mowing knife and the components carrying the counter cutting edges, such as mower fingers or a stationary or moving counter knife. In principle, it is also conceivable that a finger bar carrying the mowing fingers is moved relative to the mowing knife.

The knife force can either be the force required to drive the mowing knife as a whole, i.e. a force that could be measured, for example, with a force sensor between a drive to drive the mowing knife and the mowing knife itself. In the sense of the invention, however, the term "knife force" may also refer to individual knife force components, such as the sum of friction force and cutting force, whereby knife force components may be disregarded due to mass inertia forces and natural vibrations of the mowing knife.

The signal representing the stroke position of the mowing knife can be, for example, from a position sensor on the mowing knife or a component moving in a reciprocating matter with the mowing knife. It is also possible to determine the stroke position on the basis of a rotary position of a rotating drive element for driving the mowing knife.

For example, the signal representing the knife force for driving the mowing knife can be a measurement signal from a force sensor between a back and forth (reciprocating) moving drive element for driving the mowing knife and the mowing knife. It is also conceivable that a torque sensor is provided on a rotating drive element to drive the mowing knife, which is used to determine the drive torque. The drive torque can be converted into the knife force or directly used as the signal representing the knife force to drive the mowing knife if the drive torque changes directly proportional to the knife force. The drive power, which can also be used for further evaluation, can also be derived from the values determined in this way.

A reciprocating mowing knife has different operating characteristics in different stroke positions during a stroke. For example, the force required to drive the mowing knife and the power consumption in the reversing ranges for reversing the drive direction are different from those in the other ranges. There are also stroke ranges in which the crop is cut and the knife force is correspondingly high, and stroke position ranges in which no cutting takes place and the knife force is correspondingly low. For example, the force required to drive the mowing knife or the drive power in different cutting position ranges of several strokes can provide information for analyzing the operating condition of the cutting device.

The determination of crop and/or cutting system properties can comprise in one embodiment of the method one property from the group consisting of stock density of the crop, crop type, crop moisture, weed components, collision, wear condition of the cutting device and defect of the cutting device.

With the aid of data on the stock density of the crop, crop type and/or crop moisture, the power consumption or the required drive power of units of the harvesting machine such as a threshing unit or chopper unit, which are located in the crop flow direction downstream of the cutting device, can be predicted and/or fed into a control loop for regulating the crop flow.

This data can also be used to control the travel speed of the harvester. With decreasing crop density, the travel speed can be increased and with increasing crop density, the travel speed can be reduced in order to always ensure a crop flow that is as uniform as possible and thus a constant load on the harvesting machine's crop processing units.

The stroke movement of the mowing knife can be divided into different stroke position ranges over the entire stroke of the mowing knife, whereby a distinction can also be made between stroke position ranges in a first stroke direction and stroke position ranges in a second stroke direction.

In particular when a mowing knife is used having a plurality of cutting edges cooperating with counter cutting edges of the cutting device for cutting the crop, it may be provided that those stroke position ranges in which the cutting edges of the mowing knife perform a cut of the crop with the counter cutting edges are defined as cutting ranges.

The variance of the stock density of the crop can thus be determined by analyzing measurements of the knife force in cutting ranges taken one after the other. The higher the crop density of the crop, the higher the force (knife force) or power required to drive the mowing knife, so that the variance of the crop density can be inferred from the change in knife force in successive cutting ranges. It is also possible to use reference data for certain crop types in order to be able to determine an absolute value of the stock density in addition to the variance of the stock density.

The counter cutting edge of a cutting device are usually located on the mowing fingers or on the knife blades of a counter knife. The stroke position ranges in which the cutting edges of the mowing knife are guided past or through the mowing fingers or the knife blades of the counter knife without cutting the crop can be defined as over-stroke ranges.

In particular, when using mowing fingers with upper and lower parts which form a knife gap through which the mowing knife passes, the knife gap is cleaned or freed of any uncut crop which may have been drawn in during this over-stroke range.

If, in the over-stroke range, a higher knife force is required to drive the mowing knife than in previous measurements or compared to reference values, it can be concluded that an increased number of crop components were drawn between the knife blades moving against each other or into blade gaps of mower fingers and thus not cut. This may be due, for example, to increased moisture in the crop or other components in the crop to be cut, such as weeds.

In addition, those stroke position ranges in which the cutting edges of the mowing knife are moved between two adjacent counter cutting edges or mower fingers can be defined as cut-independent ranges. In these areas there is neither a cut of crop nor a cleaning of a blade gap from mowing fingers.

If there is increased power consumption across the cut-independent ranges, this may indicate a collision or defect in the cutting device.

When determining the knife force (or power), the average and/or maximum knife force (or power) for driving the mowing knife in certain stroke positions can be determined.

Exceeding a certain maximum limit value may indicate a collision of the cutting device with a non-cuttable object, such as a stone, a reel tine or other foreign object.

According to one embodiment of the method the average and/or maximum knife force for driving the mowing knife in different stroke position ranges of a single stroke of the mowing knife is compared. It is also possible to record the knife force curve over a single entire stroke of the mowing knife. This evaluation of the knife force curve over a single stroke or the comparison of the knife force in individual stroke position ranges of a single stroke can provide information about the crop properties or the condition of the cutting device.

According to another embodiment the average and/or maximum knife force for driving the mowing knife in identical stroke position ranges of different strokes of the mowing knife is compared. Thus, different successive strokes are compared with each other in terms of how the knife force runs in the individual stroke position ranges. Likewise, it is possible to determine a knife force curve over the individual strokes, whereby the successive knife force curves are compared with each other. Thus a temporal variance of the knife force can be analyzed.

According to a further embodiment of the method the average and/or maximum knife force for driving the mowing knife in a stroke position range is compared with a reference value for this stroke position range. As an alternative or in addition, the knife force curve of an individual stroke can also be compared with a reference knife force curve.

The object is further solved by a cutting device for an agricultural harvesting machine for mowing crop, comprising: at least one mowing knife reciprocally driven in a stroke direction; a drive driving the mowing knife; a sensor for detecting a signal representing the stroke position of the mowing knife; a sensor for detecting a signal representing the knife force for driving the mowing knife; and a processing unit for evaluating and recording the detected signals.

In general, the cutting device may have several mowing knives and at least one sensor per mowing knife for detecting a signal representing the stroke position of the mowing knife and at least one sensor for detecting a signal representing the knife force for driving the mowing knife.

A single processing unit can be assigned to each mowing knife. In one embodiment, the individual processing units of each mowing knife can be connected to a central processing unit of the cutting device for data exchange.

BRIEF DESCRIPTION OF THE DRAWINGS

The invention is explained in more detail below using the drawings.

FIG. 3 is a schematic top view of a double finger and a knife blade in different stroke positions in a cut-independent range, FIG. 4 is a schematic top view of a double finger and a knife blade in different stroke positions in a cutting range, FIG. 5 is a schematic top view of a double finger and a knife blade in different stroke positions in an over-stroke range.

DETAILED DESCRIPTION OF THE INVENTION

Figure 1:
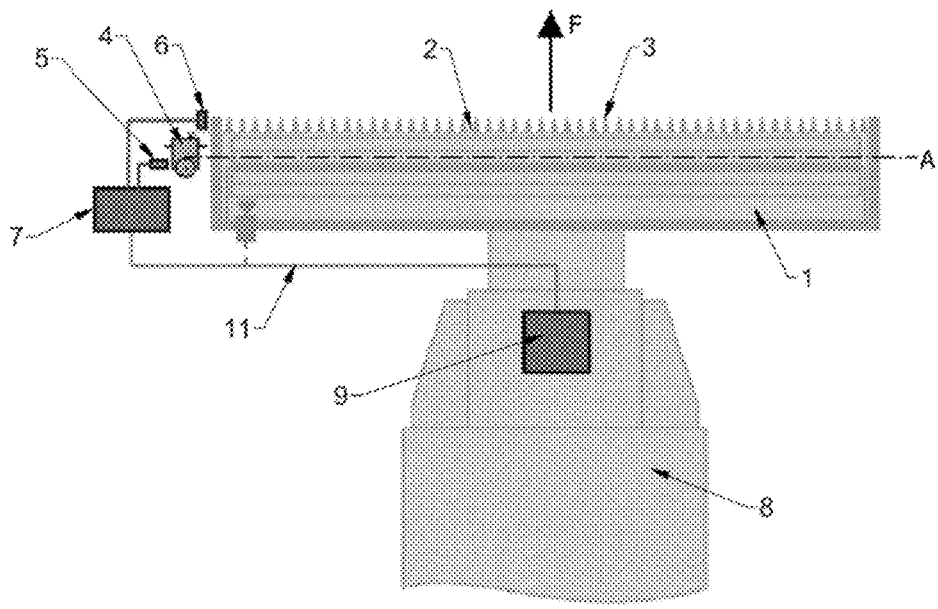
FIG. 1 is a schematic top view of a combine harvester in the area of the cutting device with a mowing knife.
Figure 2:
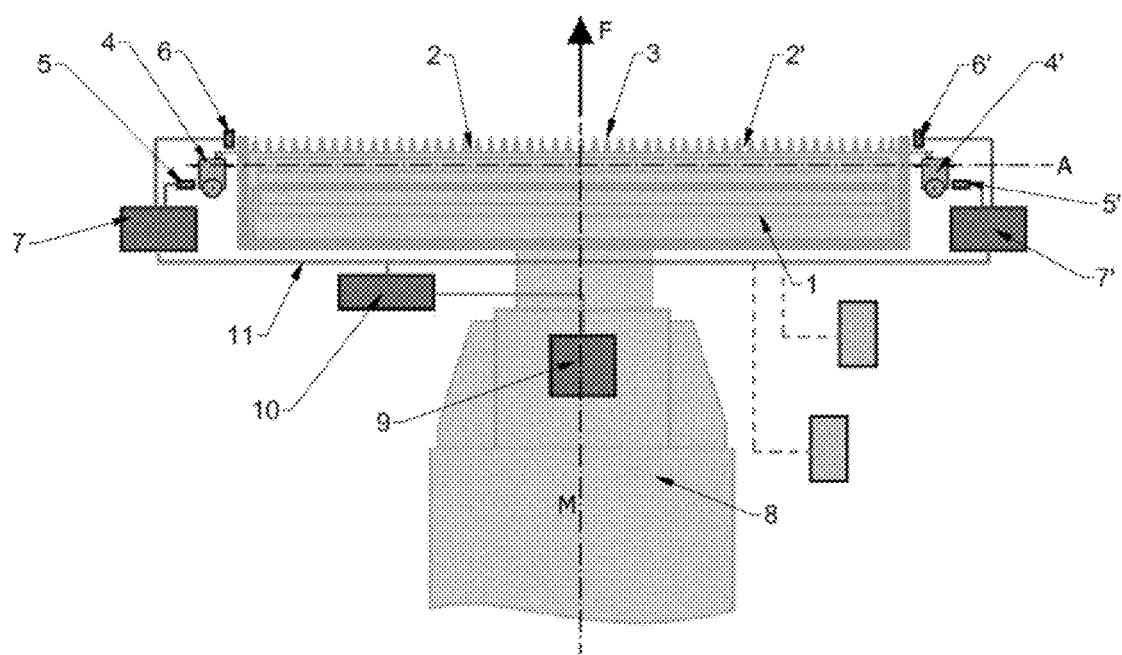
FIG. 2 is a schematic top view of a combine harvester in the area of the cutting to device with two mowing knives.

FIGS. 1 and 2 each show a schematic top view of an agricultural harvester in the form of a combine harvester 8, which can be moved in a driving direction F parallel to a center axis M of the combine harvester 8. The combine harvester 8 is shown in a section in a front area where the combine harvester 8 has a cutting device 1 for mowing crop. The cutting device 1 shown in FIG. 1 and FIG. 2 differ in that the cutting device 1 in FIG. 1 has one mowing knife 2 and the cutting device 1 in FIG. 2 has two mowing knives 2, 2'. The mowing knives 2, 2' are driven back and forth in a reciprocating manner along a drive axis A. The drive axis A runs at a right angle to the center axis M and thus transversely to the driving direction F. The mowing knives 2, 2' as shown in FIG. 2 are arranged on both sides of the central axis M and can each be driven separately.

The mowing knives 2, 2' of both versions as shown in FIG. 1 and FIG. 2 each have knife blades 3 which interact with counter cutting edges not shown here to make a cutting movement when the mowing knife 2, 2' is moved back and forth.

The mowing knife 2 of the cutting device 1 of the embodiment according to FIG. 1 is connected to a drive 4 by means of which the mowing knife 2 is driven back and forth. Drive 4 may include, for example, a gearbox, such as a toothed gear, a traction drive or similar transmission. The drive 4, in turn, can be driven mechanically, hydraulically or electrically via a drive motor of the combine harvester 8.

At least one sensor 5 is provided on cutting device 1 to determine the knife force. The sensor can, for example, be a force sensor or a torque sensor, whereby other measured values, such as power, can also be inferred from the directly measured values. In addition, a sensor 6 for determining the stroke position of the mowing knife 2 is arranged on cutting device 1.

The measured values determined by sensors 5 and 6 are transmitted to a processing unit 7 for drive 4. The measured values are recorded and evaluated in processing unit 7. The processing unit 7 may also be connected to a control unit 9 of combine harvester 8. This can be used, for example, to intervene in the drive control of the units processing the crop or in the motor control, for example to adjust the travel speed of the combine 8.

In FIG. 2, one drive 4, 4', one sensor 5, 5' for determining the knife force and one sensor 6, 6' for the stroke position of the respective mowing knife 2, 2' are provided for each mowing knife 2, 2'. The sensors 5, 5', 6, 6' for a mowing knife 2, 2' are each assigned to a processing unit 7, 7'. As shown, a central processing unit 10 can also be provided for the cutting device 1, which is connected to the two processing units 7, 7' for the drive 4, 4'. The central processing unit 10 for the cutting device 1 can in turn be connected to the control unit 9 of the combine harvester 8. However, it is also possible that the processing units 7, 7' of the drives 4, 4' are directly connected to the control unit 9 of the combine harvester.

Data lines 11 are available for data transmission between the individual processing units 7, 7', 10 and the control unit 9.

In one of the processing units 7, 7', 10 of the cutting device 1, the knife force for driving the respective mowing knife 2, 2' in certain stroke positions or stroke position ranges is determined or calculated on the basis of the measured values of the sensors 5, 5', 6, 6'. For this purpose, the stroke movement of the mowing knives 2, 2' may be divided into different stroke position ranges over the entire stroke of the respective mowing knife 2, 2'.

Figure 6:
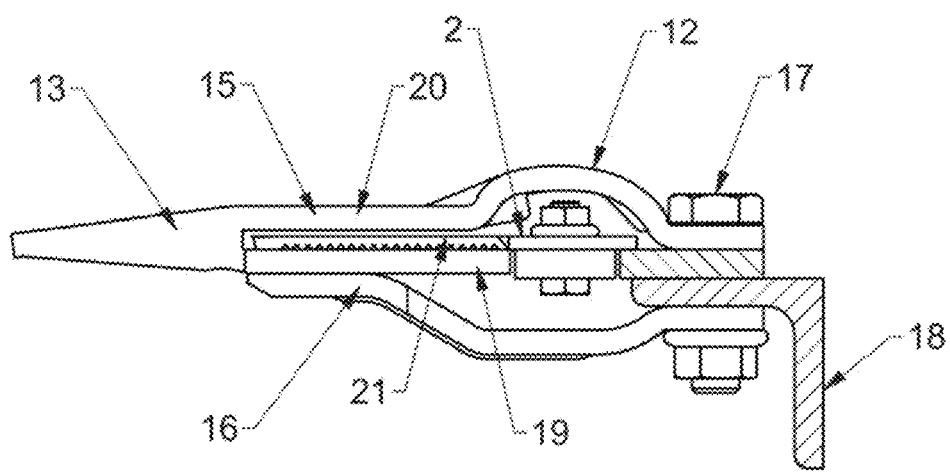
FIG. 6 is a partial longitudinal section through the cutting device in the area of a mower finger.

FIGS. 3 to 5 show different representations of the cutting device 1 in the area of a double finger 12, which has two fingers 13, 14 protruding in the driving direction F, the two fingers 13, 14 being arranged laterally spaced from each other. As shown in FIG. 6, the double finger 12 also has an upper part 15 and a lower part 16, which are firmly connected to each other. At the rear end of the cutting device, viewed in the driving direction F, the upper part 15 and the lower part 16 are connected to a cutter bar 18 of the cutting device via fastening screws 17.

A central part 19 is arranged between the upper part 15 and the lower part 16, a knife gap 21 being formed between the central part 19 and an upper web 20 of the upper part 15. The mowing knife 2 is guided in the blade gap 21.

The mowing knife 2 has knife blades 22 which are guided in the knife gap 21. The knife blades 22, viewed in drive axis A, have cutting edges 23, 24 (FIGS. 3 to 5) on both sides, which interact with counter cutting edges 25, 26 of the fingers 13, 14 to cut crop.

Basically, other fingers can also be used, such as simple fingers with only one finger facing forward, or multiple fingers with more than two fingers. Likewise, fingers can be used which do not have an upper part, but only a lower part. In addition, as an alternative to the fingers, a counter knife can also be provided, which is similar to the mowing knife and is equipped with corresponding knife blades.

FIGS. 3 to 5 show to simplify matters only the double finger 12 and a knife blade 22 in different stroke positions relative to the double finger 12, whereby the upper part of the double finger 12 is not shown for the sake of clarity. In each of FIGS. 3 to 5, the knife blade 22 is shown in two stroke positions, one in an initial position, in which the knife blade is shown with solid lines, and the other in an end position, in which the knife blade 22 is shown with broken lines. The respective starting positions and end positions define the start and end of different stroke position ranges.

From FIG. 3 to FIG. 4 and to FIG. 5, a complete stroke of the mowing knife is shown, in a stroke direction H parallel to the drive axis A. FIG. 3 shows a first stroke range H1 from a turning point arranged on the right in FIG. 3, in which the direction of movement of the mowing knife and thus of the knife blade 22 of the mowing knife shown is reversed, i.e. to the left in the illustration. Starting from the right turning point where the knife blade 22 is shown with solid lines, the knife blade 22 is moved to a first intermediate position where the knife blade 22 is shown with broken lines. Over this first stroke range H1, which can also be described as a cut-independent range, the cutting edge 23 of the knife blade 22 at the front in stroke direction H does not cross the counter cutting edge 25' of the left finger 14, so that no cut is made.

FIG. 4 shows a second stroke range H2 from the first intermediate position shown in FIG. 4 on the right, in which the knife blade 22 is shown with solid lines, to reaching a second intermediate position on the left, in which the knife blade 22 is shown with broken lines. Over this second stroke range H2, which can also be referred to as the cutting range, the cutting edge 23 of the knife blade 22 at the front in stroke direction H crosses the counter cutting edge 25' of the left finger 14 so that a cutting movement takes place.

FIG. 5 shows a third stroke range H3 from the second intermediate position shown to in FIG. 5 on the right, in which the knife blade 22 is shown with solid lines, to reaching a left turning point, in which the knife blade 22 is shown with broken lines. At left turning points, the stroke direction changes from a left movement to a movement back to the right. This third stroke range H3, which can also be referred to as the over-stroke range, guides the mowing knife 2 past or through the left finger 14 without cutting the crop.

Figure 7:
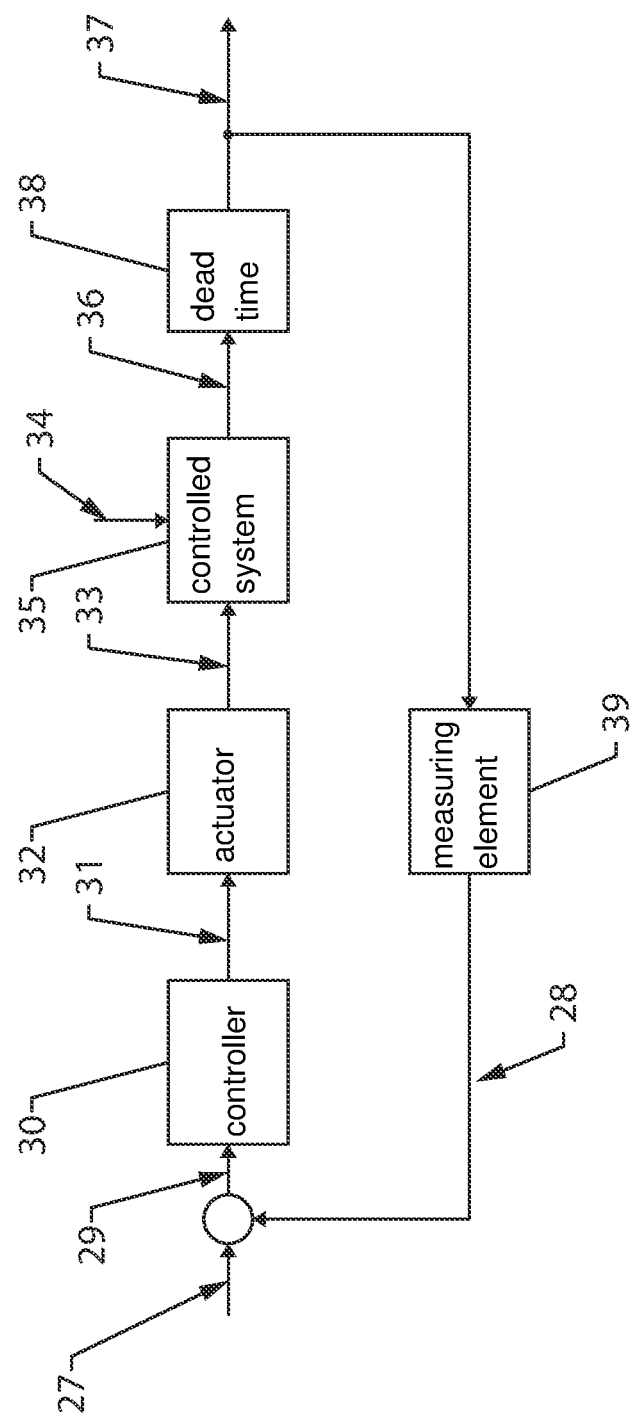
FIG. 7 shows a control loop for controlling the engine load of a harvester.

FIG. 7 shows a conventional exemplary control loop for controlling the engine load. The reference value 27 is the nominal value of the motor load and the feedback 28 is the actual value of the motor load. These two values together result in control deviation 29, which is fed to a controller for controlling the motor load. Controller 30 outputs a setpoint as (general) control value 31 for the travel speed. The control value 31 of the travel speed 31 is fed to an actuator 32 for controlling the travel drive, resulting in an actual value of the travel speed 33 (as control value). Due to the cutting device settings, crop characteristics and working width of the cutting device used, which are the disturbance value 34, the throughput of the cutting device over the controlled system 35 is 36. The throughput of the harvesting machine 37 in the processing units downstream of the cutting device, such as a threshing unit, can only be determined after a dead time 38, as the crop must first be transported from the cutting device to the threshing unit.

The controlled value of the throughput of the harvester 37 is fed back via the measuring element 39 of the main engine as the actual engine load value 28.

Harvesters, in particular combine harvesters, are limited in their threshing capacity by the engine power. In order to cope with local increases in stock density, a power reserve must be maintained for the engine so that threshing elements do not clog up but can absorb stock density peaks. Due to the transport dead time of the crop from the cutting device to the threshing organ, conventional regulations, as shown in FIG. 7, only react to changed crop densities when the crop has already arrived in the threshing organ. The throughput of the harvesting machine is regulated here. The travel speed serves as the control value.

Figure 8:
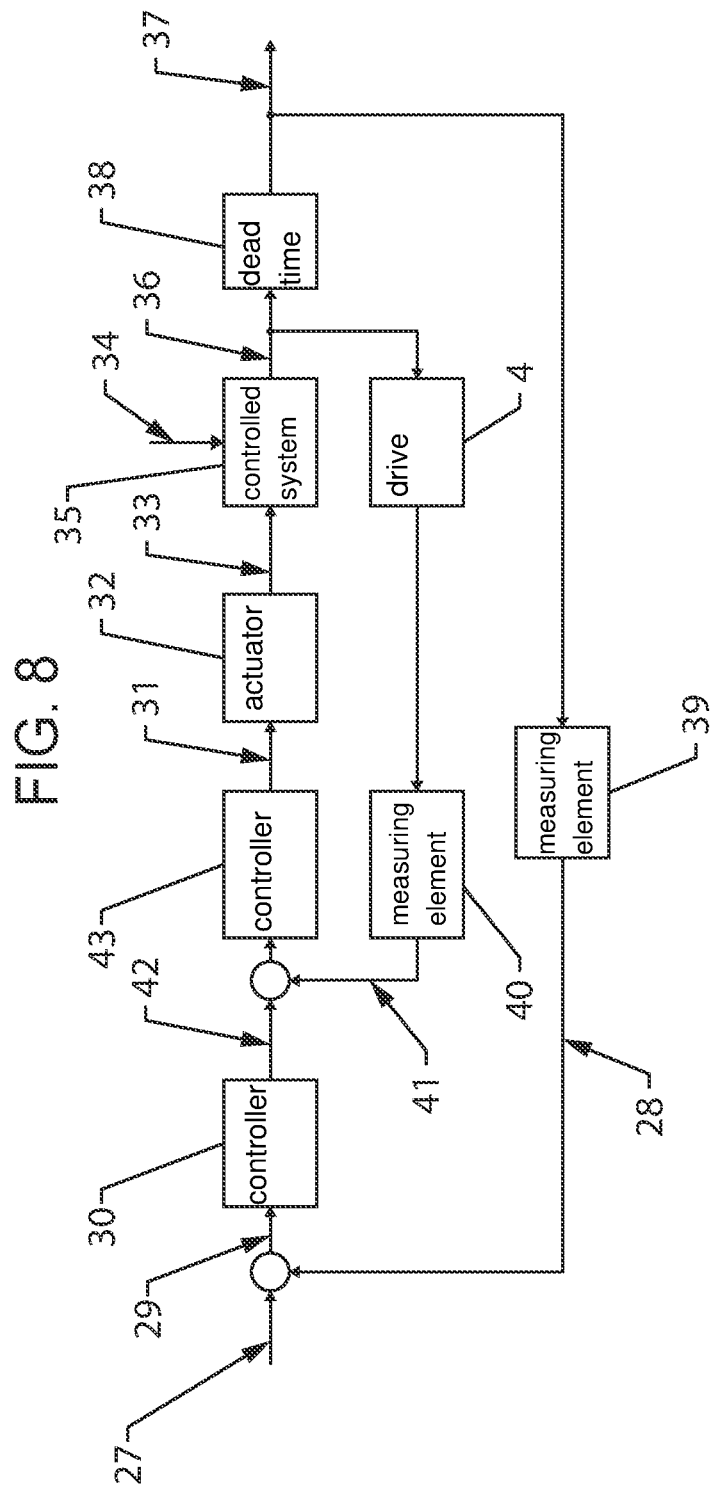
FIG. 8 shows a cascaded control loop for controlling the engine load of a harvester.

FIG. 8 shows an adapted regulation. The control loop is initially designed in the same way as the control loop shown in FIG. 7. However, the throughput of cutting device 36 is already reduced in a cascaded control system. The sensors described above on the cutting device, which are specified here as measuring element 40, are used for this purpose. These output, for example, the required power of the knife drive 41. This is fed to a controller 43 with a nominal value of the knife drive power 42 for controlling the cutting system load. The controller 30 for the motor load does not output a travel speed nominal value, but the nominal value 42 for the knife drive. The controller for the editing system load 43 finally outputs the nominal value for the travel speed 31.

This results in a control loop that records stock fluctuations before they affect the threshing organ and can therefore react more quickly.

REFERENCE NUMERALS LIST

1 Cutting device
2, 2' Mowing knife
3 Knife blade
4, 4' Drive
5, 5' Sensor for knife force
6, 6' Sensor for stroke position
7, 7' Processing unit for the drive
8 Combine harvester
9 Combine harvester control unit
10 Processing unit for the cutting device
11 Data line
12 Double finger
13 Finger
14 Finger
15 Upper part
16 Lower part
17 Fixing screws
18 Cutter bar
19 Middle part
20 upper web
21 Balde gap
22 Knife blade
23 Cutting edge
24 Cutting edge
25, 25' Counter cutting edge
26, 26' Counter cutting edge
27 Reference variable (nominal value)
28 Feedback (actual value)
29 Control deviation
30 Controller
31 Control value for travel speed
32 Actuator
33 Actual value of the travel speed
34 Disturbance value
35 Controlled system cutting device
36 Cutting device throughput
37 Harvester throughput
38 Dead time
39 Measuring element
40 Sensors
41 Power actual value
42 Power nominal value
43 Controller cutting system load
A Drive axis
F Driving direction
$H_1$, $H_2$, $H_3$ Stroke position range
M Center axis

The invention claimed is:

1. A method for analyzing the operating state of a cutting device for mowing crop, the cutting device having at least one mowing knife which is driven in reciprocating manner in a stroke direction H, and the mowing knife having cutting edges which interact with counter cutting edges of the cutting device, with the following method steps:
    detecting of a signal representing the stroke position of the mowing knife,
    detecting a signal representing a knife force for driving the mowing knife as a function of the stroke position, and
    determining crop and/or cutting device properties on the basis of an evaluation of the signal representing the knife force as a function of the stroke position.

2. The method according to claim 1
    wherein the determination of crop and/or cutting device properties comprises at least one property from the group consisting of stock density of the crop, crop type, crop moisture, weed components, collision of the cutting device with a non-cuttable object, wear condition of the cutting device and defect of the cutting device.

3. The method according to claim 1
    wherein the stroke movement of the mowing knife is divided into different stroke position ranges over the entire stroke of the mowing knife.

4. The method according to claim 1
    wherein stroke position ranges are defined as cutting ranges in which the cutting edges of the mowing knife make a cut of the crop with the counter cutting edges.

5. The method according to claim 1
    wherein stroke position ranges are defined as over-stroke ranges in which the cutting edges of the mowing knife are guided past or through mower fingers or knife blades of a counter knife without cutting the crop.

6. The method according to claim 1
    wherein stroke position ranges are defined as cut-independent ranges in which the cutting edges of the mowing knife neither make a cut of the crop with the counter cutting edges nor are they guided past or through mower fingers or knife blades of a counter knife.

7. The method according to claim 1
wherein the average and/or maximum knife force or a measured value derived from the knife force is determined in specific stroke position ranges, and
   said knife force of measured value at different stroke position ranges of a single stroke of the mowing knife are compared with one another,
   said knife force of measured value at identical stroke position ranges of different strokes of the mowing knife are compared with one another, and/or
   said knife force of measured value at an individual stroke position range is compared with a reference value for the individual stroke position range.

8. The method according to claim 1
wherein a unit for processing crop and/or a travel speed of an agricultural harvesting machine carrying the cutting device is controlled on the basis of the signal representing the knife force or a measured value derived from the knife force as a function of the stroke position.

9. A cutting device for an agricultural harvesting machine for mowing crop, comprising
   at least one mowing knife driven in reciprocating manner in a stroke direction,
   a drive driving the mowing knife,
   a sensor for detecting a signal representing the stroke position of the mowing knife,
   a sensor for detecting a signal which represents a knife force for driving the mowing knife, and
   a processing unit for evaluating and recording the detected signals.

10. The cutting device according to claim 9
wherein a processing unit is assigned to each mowing knife.

11. The cutting device according to claim 10
wherein the cutting device also has a central processing unit which is connected to the processing units of a plurality of mowing knives for data exchange.

\* \* \* \* \*